No. 863,991.
PATENTED AUG. 20, 1907.
G. W. HAYDEN.
TILTING STEAM TRAP.
APPLICATION FILED JUNE 15, 1906.
2 SHEETS—SHEET 1.
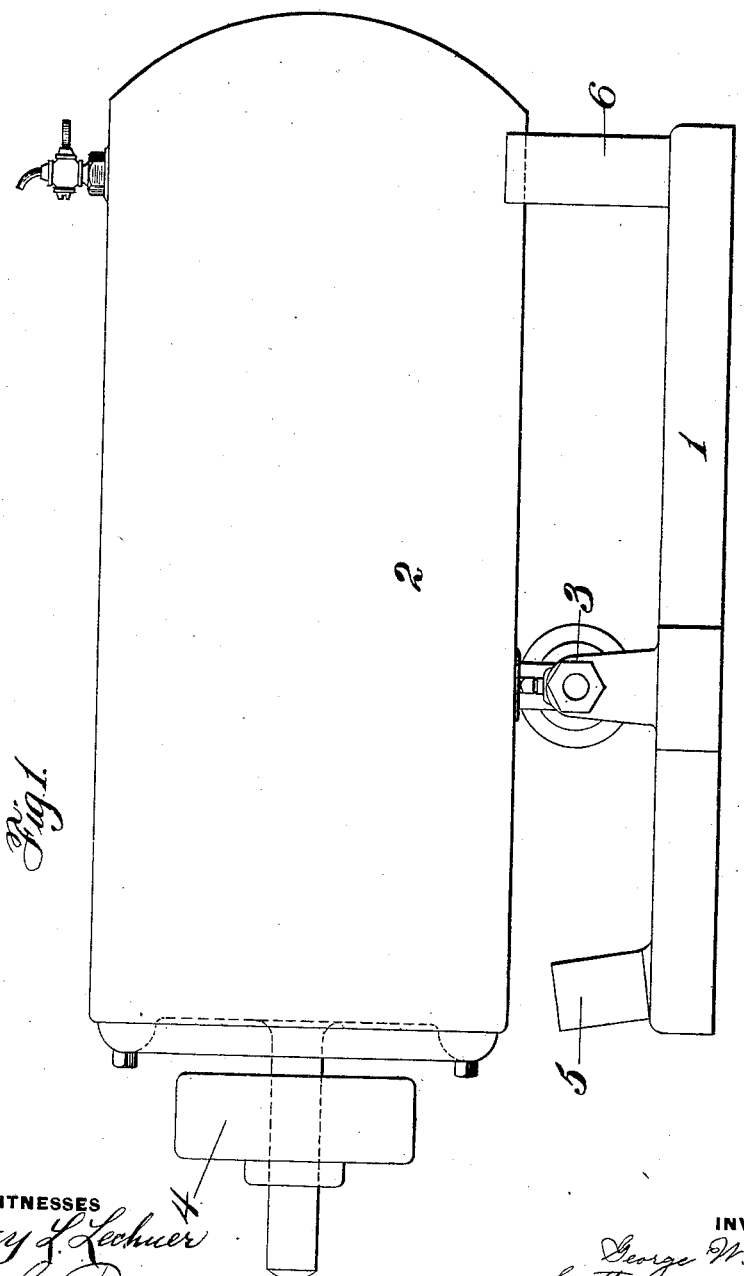
WITNESSES
Harvey L. Lechner
James C. Bradley
INVENTOR
George W. Hayden
by atty's
Synnestvedt & Carpenter

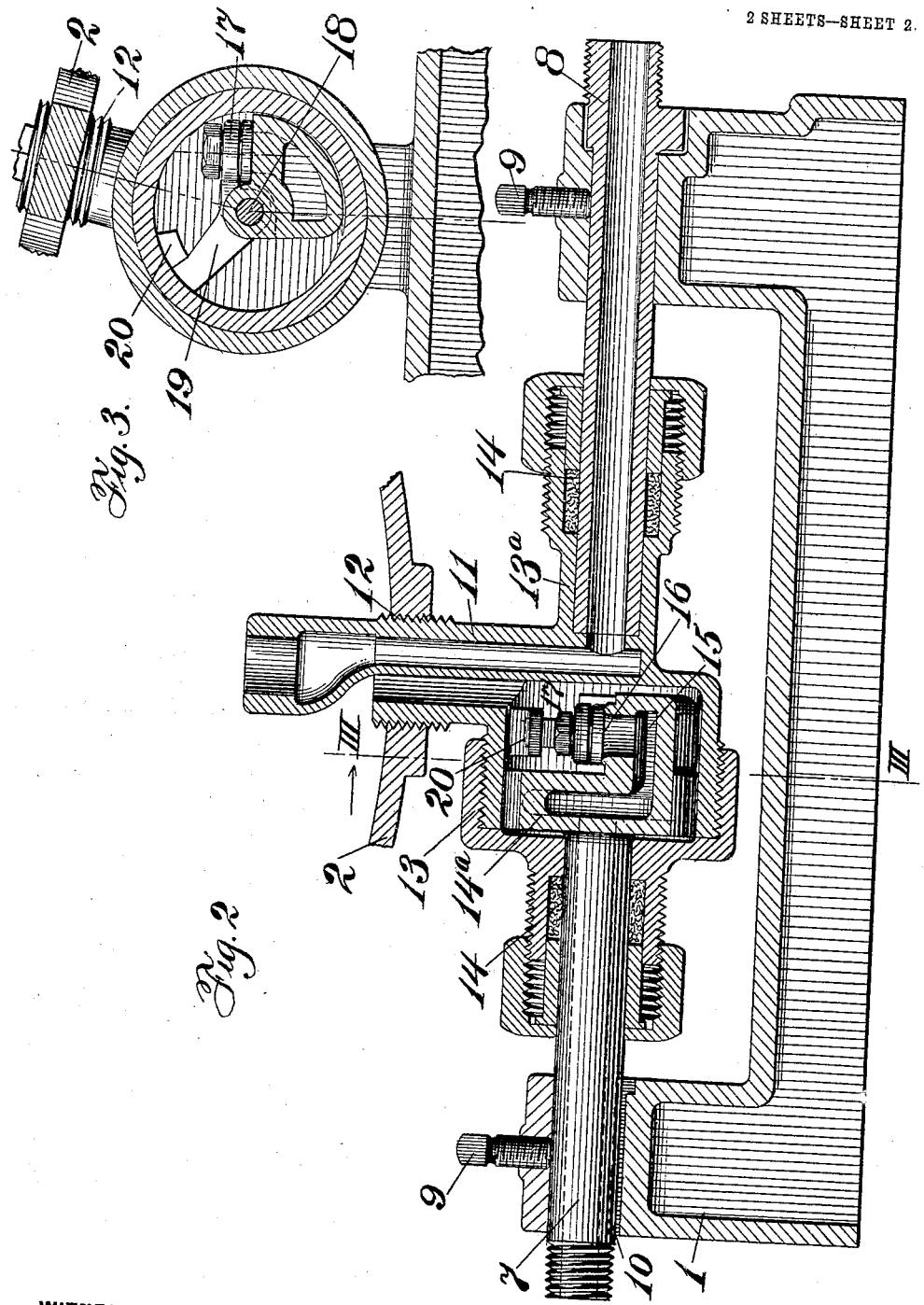

UNITED STATES PATENT OFFICE.

GEORGE W. HAYDEN, OF CHICAGO, ILLINOIS, ASSIGNOR TO CRANE COMPANY, OF CHICAGO, ILLINOIS, A CORPORATION OF ILLINOIS.

TILTING STEAM-TRAP.

No. 863,991.   Specification of Letters Patent.   Patented Aug. 20, 1907.

Application filed June 15, 1906. Serial No. 321,873.

*To all whom it may concern:*

Be it known that I, GEORGE W. HAYDEN, a citizen of the United States, residing at Chicago, in the county of Cook and State of Illinois, have invented certain new and useful Improvements in Tilting Steam-Traps, of which the following is a specification.

My invention relates to tilting steam traps and has for its objects; to provide a tilting trap in which the valve mechanism is simplified and in which the weights and levers heretofore used at the side of the tank for operating the valve mechanism are done away with; to provide a valve mechanism operated by the tilting of the trap which is entirely inclosed in the discharge passage; and finally to provide a valve of durable and inexpensive construction which shall be positive in its action and free from liability of accident or disarrangement. These and other objects are accomplished by my invention one form of which is illustrated in the accompanying drawings in which Figure 1 is a side elevation of the steam trap equipped with my valve mechanism in discharging position, Figure 2 is a transverse section through the admission and discharge axis, showing my improved valve mechanism as applied therein, and Figure 3 is a transverse section through Figure 2, on the line 111—111, looking in the direction of the arrow.

The device belongs to that type of steam traps in which an accumulation of water overbalances a counterweight and tilts the tank thereby opening the valve and permitting the accumulated water to be discharged. The invention has to do primarily with the means for operating the valve which permits of the discharge when the trap is tilted, and heretofore this valve mechanism has been operated by means of weights and levers located on the outside of the tilting tank and operated by the movement of the tank to open and close the discharge at the proper time. My invention is designed to do away with these levers and weights and this is accomplished by placing the operating mechanism for the valve and the valve itself inside of the discharge axis thereby improving the outward appearance of the tank, simplifying the general construction, and placing the valve in a position where it will be protected from all outside disturbance. The invention is shown as applied to a non-return trap but the principle thereof is obviously applicable to a return trap also.

As shown in the drawings, 1 is the base of the trap upon which is mounted the tilting tank 2, pivoted at 3 and provided with the counterweight 4. At either end of the tank are supports 5 and 6 which are adapted to support the tilting tank in its two extreme positions. In the particular trap employed in the present instance the position shown in Figure 1 is that of discharge and while in such position the valve in the hollow axis is open. After the water has been discharged from the tank it will oscillate to such a position that the forward end rests upon the support 5, such movement occurring because of the counterweight 4 on the front end of the tank. The valve mechanism is however equally adaptable to tanks in which this operation is reversed, and in which the discharge position is a tilting one and the accumulation or receiving position is a horizontal one. Figures 2 and 3 show in detail the mechanism located inside of the hollow axis whereby the valve is opened upon the tilting of the tank 2, the upper portion of such tank being broken away. The tank is tiltingly supported upon the two trunnions 7 and 8, which members are non-rotatively fixed in the frame 1 by means of the set screws 9 and the keys 10. These trunnions carry rotatably the member 11 to which the tank 2 is screw threaded at 12. Screw threaded to the left hand side of the member 11 is the member 13, which member 13 together with the right hand arm $13^a$ of the member 11 constitute the bearings for the members 7 and 8 respectively and such members 13 and $13^a$ are provided with stuffing boxes 14. The trunnion 8 constitutes the admission passage to the tank while the trunnion 7 constitutes the discharge passage. The right hand end of the trunnion 7 is provided with an enlargement $14^a$ which enlargement $14^a$ has a passage 15 leading into the trunnion 7 at one end and into the member 11 by means of the valve opening 16 at the other end. Mounted upon this enlargement $14^a$ is the valve 17. This valve which is pivoted at 18 has its end fitting over the end of the valve passage 16 and is provided at its other end with an operating arm 19. Normally the valve is kept closed by means of its own weight and is opened only when the tank moves to its horizontal position. In order to operate the valve by the tilting of the tank a projecting lug 20 is provided on the interior of the member 11 in such a position that normally, as indicated in Figure 3, it will just engage the arm 19 without tilting it but when the tank is filled and moves to the horizontal position shown in Figure 1, such lug 20 rotates to the left and tilts the arm 19 to such a position that the valve 17 opens the valve passage 16 allowing the discharge of the water through the trunnion 7.

The operation briefly is as follows:

Assuming that the tank is empty and in a tilted position with its front end resting against the support 5 and the valve closed in the position indicated in Figure 3, the tank is gradually filled with condensed water from the system passing into the trunnion 8, and when sufficient water has accumulated in the tank 2 to counterbalance the counterweight 4, the tank will revolve about the trunnions 7 and 8 to the position shown in Figure 1. During this revolution the lug 20 which is in engagement with the arm 19 of the valve 17 will move such arm 19 downward thereby raising the valve 17 and allowing the accumulated water to escape through such valve and out of the trunnion 7. When all of the water has been discharged the counterbalance 4 will bring the tank to its original tilting position, and in such reverse movement the valve 17 by virtue of its own weight will move to closed position, the arm 19 following the lug 20 back to the position shown in Figure 3.

The utility of my construction is obvious, as by means of the arrangement hereinbefore described and illustrated I am enabled to greatly simplify the construction and reduce the weight of the valve operating mechanism and thereby reduce the cost. The valve 17 is a very light and simple affair as compared with the old system of counterweights and levers. Furthermore I am enabled to put my valve operating mechanism entirely out of sight thereby giving a trap of much neater appearance and placing the parts in such position that they are protected from all accidents and outside interference.

It will be apparent that various modifications of my invention may be made without departing from the spirit thereof. For instance it will be obvious that various other arrangements of valve and operating lug might be made as the valve is not necessarily a pivoted one and the relative positions of the lug and the valve might be reversed and the lug be stationary, and the valve mounted upon a rotatable part. The above and other modifications will be apparent to those skilled in the art and are comprehended by my invention. Furthermore the device is applicable to other relations than the one shown.

Having thus described my invention and illustrated its use, what I claim as new and desire to secure by Letters Patent, is the following:

1. In combination, a tilting tank, a hollow discharge axis therefor, a valve and valve seat located in the axis, and engaging means located inside the axis whereby the valve is unseated by the tilting of the tank.

2. In combination, a tilting tank, a hollow admitting and exhaust axis therefor, a valve located in the discharge portion of the axis, and engaging means in such discharge portion of the axis whereby the valve is operated by the tilting of the tank.

3. In combination, a tilting tank, a hollow discharge axis therefor comprising a non-rotatable portion and a rotatable portion secured to the tank, a valve secured to the non-rotatable portion inside of the rotatable portion, and engaging means on the rotatable portion for operating the valve on the tilting of the tank.

4. In combination, a tilting tank, a hollow discharge axis therefor, a pivoted valve with an operating arm located in the axis, and engaging means for the valve arm in the axis whereby the valve is operated by the tilting of the tank.

In testimony whereof I have hereunto signed my name in the presence of the two subscribed witnesses.

GEORGE W. HAYDEN.

Witnesses:
 PAUL CARPENTER,
 JAMES NICHOLAS LORENZ.